US00RE41713E

(19) United States
(12) Reissued Patent
Gunderson et al.

(10) Patent Number: US RE41,713 E
(45) Date of Reissued Patent: Sep. 21, 2010

(54) FILTER WITH EFFICIENTLY SEALED END

(75) Inventors: Larry T. Gunderson, Madison, WI (US); Thomas A. Fosdal, Stoughton, WI (US); Gregory J. Schoenmann, Stoughton, WI (US); Kelly R. Schmitz, Brentwood, TN (US)

(73) Assignee: Cummins Filtration IP Inc., Minneapolis, MN (US)

(21) Appl. No.: 11/759,884

(22) Filed: Jun. 7, 2007

Related U.S. Patent Documents

Reissue of:
(64) Patent No.: 6,902,598
Issued: Jun. 7, 2005
Appl. No.: 10/428,459
Filed: May 2, 2003

(51) Int. Cl.
*B01D 35/30* (2006.01)

(52) U.S. Cl. ..... 55/498; 55/502; 55/510
(58) Field of Classification Search ..... 55/497, 55/498, 502, 503, 505, 510
See application file for complete search history.

(56) References Cited

U.S. PATENT DOCUMENTS

| | | | | |
|---|---|---|---|---|
| 2,599,604 | A | 6/1952 | Bauer | 210/169 |
| 2,962,121 | A | 11/1960 | Wilber | 55/480 |
| 3,147,100 | A | 9/1964 | Wilber | 55/419 |
| 3,160,488 | A | 12/1964 | Wilber | 55/501 |
| 3,334,753 | A | 8/1967 | Royer | 210/457 |
| 4,065,341 | A | 12/1977 | Cub | 156/187 |
| 4,310,419 | A | 1/1982 | Nara et al. | 210/493.4 |
| 4,559,066 | A | 12/1985 | Hunter et al. | 96/117.5 |
| 4,589,983 | A | 5/1986 | Wydevan | 210/317 |
| 4,609,465 | A | 9/1986 | Miller | 210/323.2 |
| 4,634,527 | A | 1/1987 | Marshall | 210/232 |
| 4,720,292 | A | 1/1988 | Engel et al. | 55/337 |
| 4,759,783 | A | 7/1988 | Machado | 55/498 |
| 5,106,397 | A | 4/1992 | Jaroszczyk | 55/270 |
| 5,167,683 | A | 12/1992 | Behrendt et al. | 55/478 |
| 5,275,636 | A | 1/1994 | Dudley et al. | 55/274 |
| 5,415,677 | A | 5/1995 | Ager et al. | 55/482 |
| 5,431,706 | A | 7/1995 | Paas | 55/342 |
| 5,484,466 | A | 1/1996 | Brown et al. | 55/498 |
| 5,487,767 | A | 1/1996 | Brown | 55/357 |
| 5,547,480 | A | 8/1996 | Coulonvaux | 55/498 |
| 5,556,440 | A | 9/1996 | Mullins et al. | 55/498 |
| 5,562,825 | A | 10/1996 | Yamada | 210/321.74 |
| 5,601,626 | A | 2/1997 | Hori et al. | 55/493 |
| 5,601,717 | A | 2/1997 | Villette et al. | 210/493.1 |
| 5,605,625 | A | 2/1997 | Mills | 210/232 |
| 5,632,791 | A | 5/1997 | Oussoren et al. | 55/486 |
| 5,660,608 | A | 8/1997 | Batholome | 55/498 |
| 5,669,949 | A | 9/1997 | Dudrey et al. | 55/486 |
| 5,674,393 | A | 10/1997 | Terhune et al. | 210/315 |
| 5,685,985 | A | 11/1997 | Brown et al. | 210/450 |
| 5,693,109 | A | 12/1997 | Coulonvaux | 55/498 |

(Continued)

FOREIGN PATENT DOCUMENTS

| | | |
|---|---|---|
| DE | 3001674 | 7/1981 |

(Continued)

*Primary Examiner*—Robert A Hopkins
(74) *Attorney, Agent, or Firm*—Andrus, Sceales, Starke & Sawall, LLP; J. Bruce Schelkopf

(57) ABSTRACT

A filter element has a resiliently compressible end cap at a first axial end sealing the filter and providing sealed engagement with a flow tube.

23 Claims, 9 Drawing Sheets

U.S. PATENT DOCUMENTS

| | | | | |
|---|---|---|---|---|
| 5,725,624 | A | 3/1998 | Ernst et al. | 55/502 |
| 5,730,769 | A | 3/1998 | Dungs et al. | 55/385.3 |
| 5,741,421 | A | 4/1998 | Erdmannsdoerfer et al. | 210/450 |
| 5,755,842 | A | 5/1998 | Patel et al. | 55/330 |
| 5,755,843 | A | 5/1998 | Sundquist | 55/385.3 |
| 5,797,973 | A | 8/1998 | Dudrey et al. | 55/372 |
| 5,800,581 | A | 9/1998 | Gielink et al. | 55/385.3 |
| 5,803,941 | A | 9/1998 | Berkhoel et al. | 55/598 |
| 5,814,219 | A | 9/1998 | Friedmann et al. | 210/493.3 |
| 5,830,941 | A | 11/1998 | Aimura et al. | 524/456 |
| 5,863,313 | A | 1/1999 | Coulonvaux | 55/498 |
| 5,871,645 | A | 2/1999 | Reed et al. | 210/493.2 |
| 5,885,314 | A | 3/1999 | Oussoren et al. | 55/486 |
| 5,893,937 | A | 4/1999 | Moessinger | 55/385.3 |
| 5,954,849 | A | 9/1999 | Berkhoel et al. | 55/498 |
| 6,019,804 | A | 2/2000 | Requejo et al. | 44/275 |
| 6,143,049 | A | 11/2000 | Gieseke et al. | 55/385.3 |
| 6,149,700 | A | 11/2000 | Morgan et al. | 55/385.3 |
| 6,152,996 | A | 11/2000 | Linnersten et al. | 96/135 |
| 6,179,890 | B1 | 1/2001 | Ramos et al. | 55/482 |
| 6,187,240 | B1 | 2/2001 | Coulonvaux | 264/249 |
| 6,261,334 | B1 | 7/2001 | Morgan et al. | 55/498 |
| 6,306,193 | B1 | 10/2001 | Morgan et al. | 55/498 |
| 6,375,700 | B1 | 4/2002 | Jaroszczyk et al. | 55/498 |
| 6,383,244 | B1 | 5/2002 | Wake et al. | 55/482 |
| 6,391,076 | B1 | 5/2002 | Jaroszczyk et al. | 55/498 |
| 6,398,832 | B2 | 6/2002 | Morgan et al. | 55/385.3 |
| 6,416,561 | B1 | 7/2002 | Kallsen et al. | 55/482 |
| 6,447,567 | B1 | 9/2002 | Ehrenberg | 55/498 |
| 6,482,247 | B2 | 11/2002 | Jaroszczyk et al. | 55/484 |
| 6,511,599 | B2 | 1/2003 | Jaroszczyk et al. | 210/493.5 |

FOREIGN PATENT DOCUMENTS

| | | |
|---|---|---|
| DE | 3405719 | 8/1985 |
| FR | 1131647 | 10/1956 |
| FR | 2261041 | 12/1975 |
| GB | 1499922 | 2/1978 |
| GB | 2110110 | 6/1983 |

FIG. 1
PRIOR ART
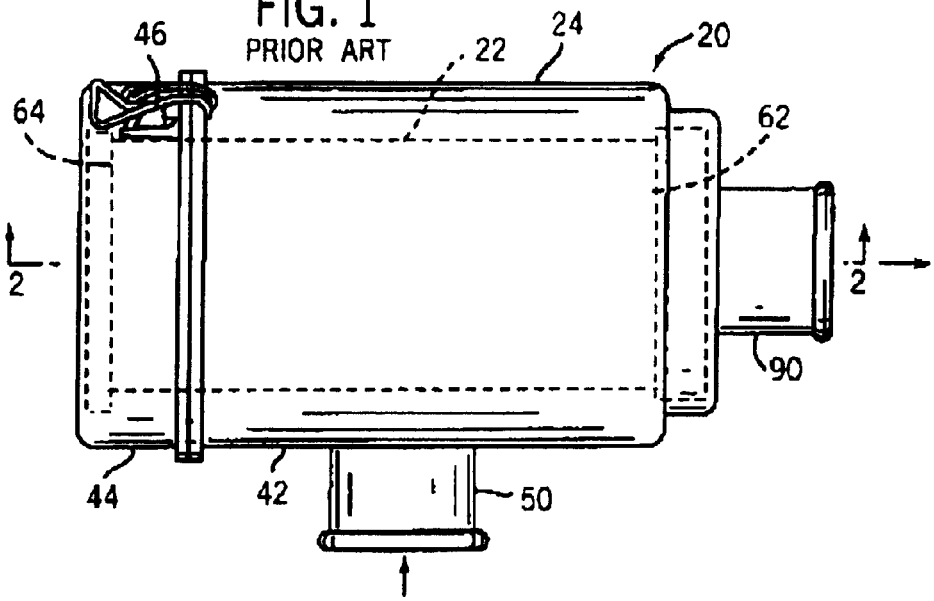
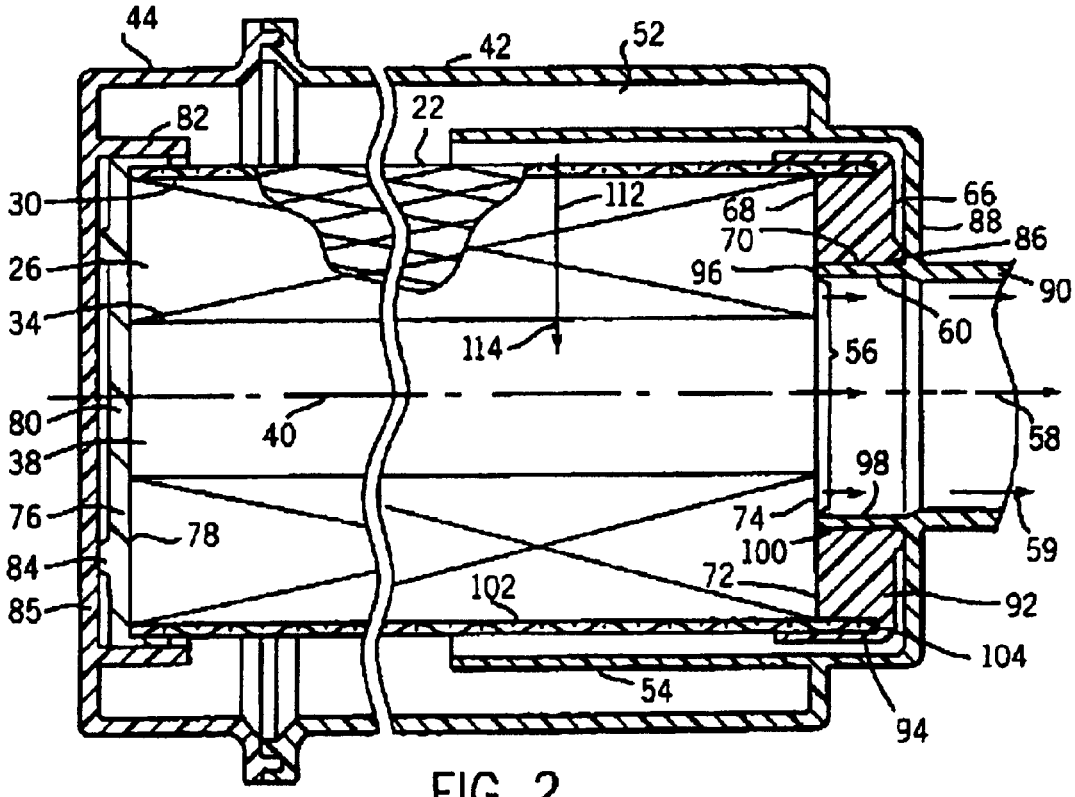
FIG. 2
PRIOR ART

FILTER WITH EFFICIENTLY SEALED END

Matter enclosed in heavy brackets [ ] appears in the original patent but forms no part of this reissue specification; matter printed in italics indicates the additions made by reissue.

BACKGROUND AND SUMMARY

The invention relates to fluid filters, and more particularly to improved sealing of the filter media end.

The invention arose during continuing development efforts relating to filter elements having pleated filter media having a plurality of pleats in a closed loop, typically annular, for example as shown in U.S. Pat. Nos. 6,149,700, 6,261,334, 6,391,076, 6,398,832, all incorporated herein by reference. The closed loop pleated filter media has an outer perimeter defined by a plurality of outer pleat tips, and an inner perimeter defined by a plurality of inner pleat tips, and has a hollow interior extending along a given axis. Fluid flows axially in the hollow interior, before or after flow through the media, depending on whether the flow is inside-out or outside-in. The filter element has an open axial end providing an axial flow passage therethrough along the axis communicating with the hollow interior.

The present invention relates to improved sealing of the pleat ends at the open axial end of the filter element, including improvements in both the effectiveness of the sealing and manufacturing efficiency for cost reduction. The invention further relates to other filter media end sealing techniques.

BRIEF DESCRIPTION OF THE DRAWINGS

Prior Art

FIG. 1 is taken from FIG. 1 of incorporated U.S. Pat. No. 6,149,700.

FIG. 2 is taken from FIG. 2 of the noted incorporated '700 patent and is a sectional view taken along line 2—2 of FIG. 1.

Present Invention

Figure 7:
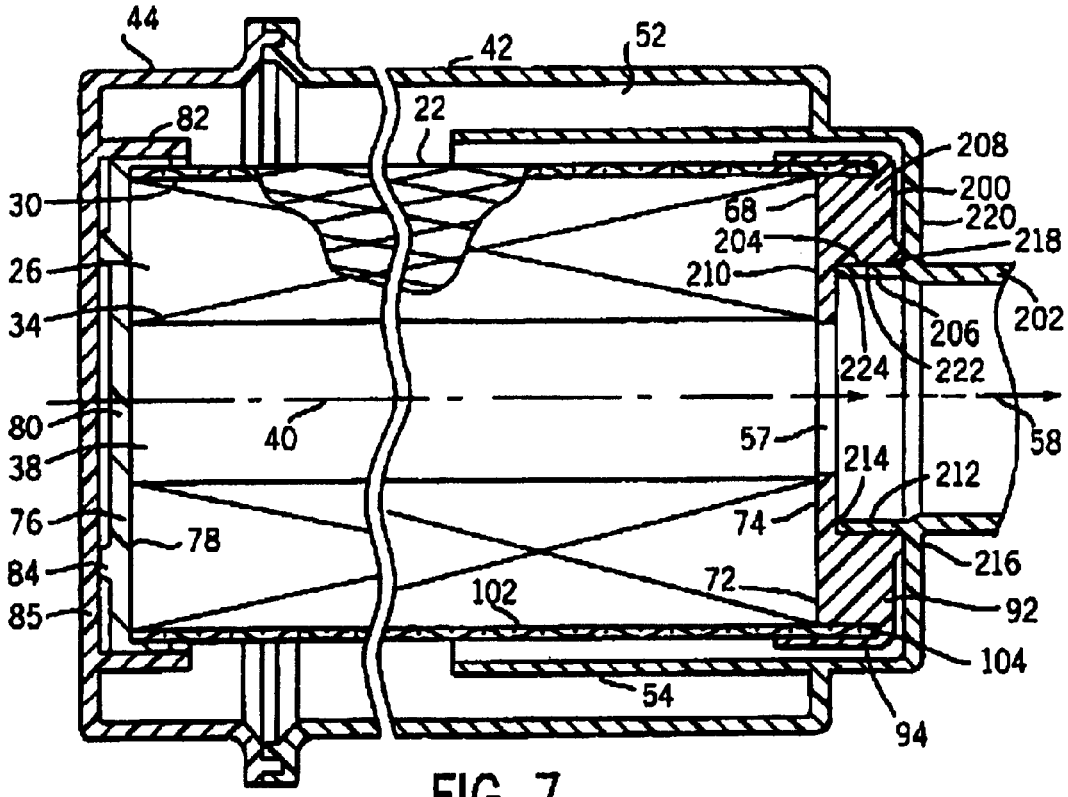

FIG. 7 is like FIG. 2 and shows the present invention.

Figure 3:
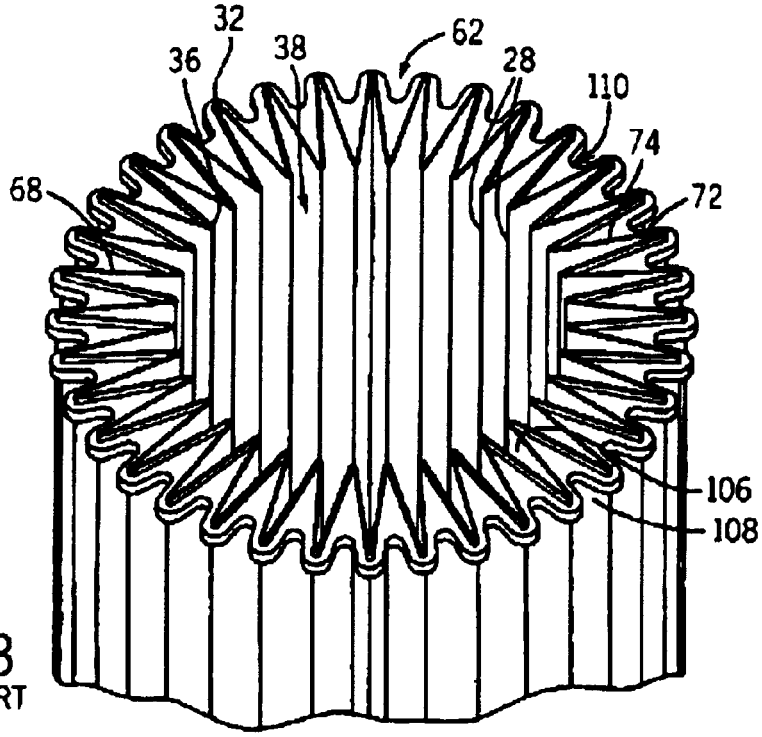
FIG. 3 PRIOR ART
FIG. 3 illustrates prior art and shows the open axial end of a closed loop pleated media filter element prior to potting of the end cap.
Figure 8:
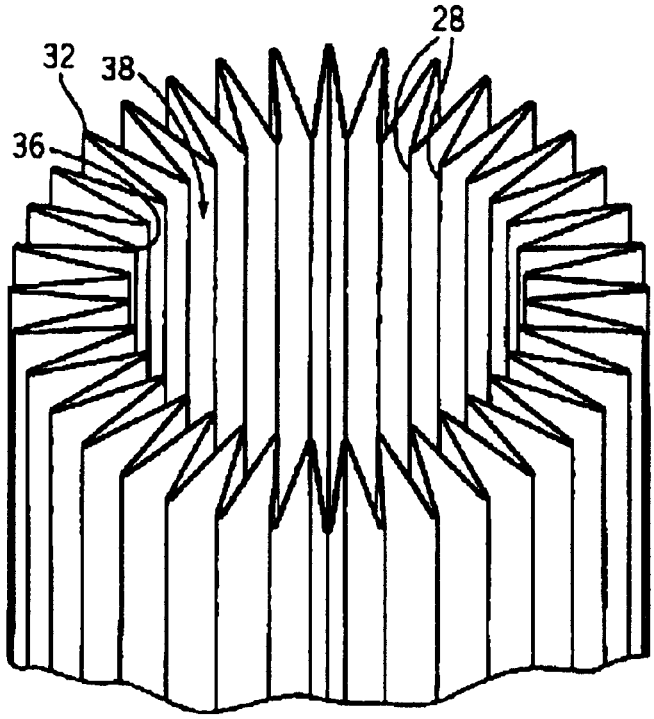

FIG. 8 is like FIG. 3 and shows the present invention.

Figure 4:
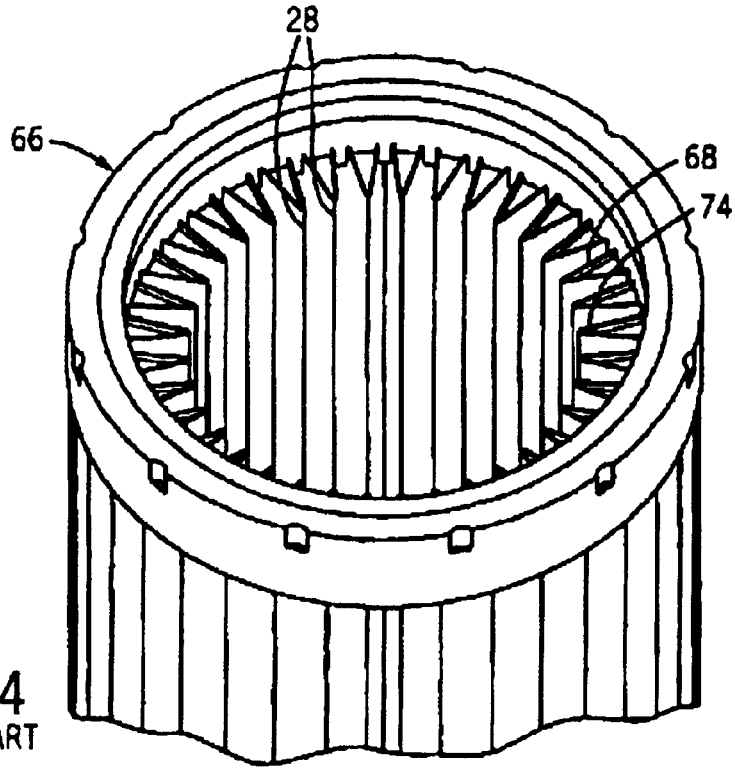
FIG. 4 PRIOR ART
FIG. 4 illustrates prior art and shows the open axial end of the filter element of FIG. 3 after potting of the end cap.
Figure 9:
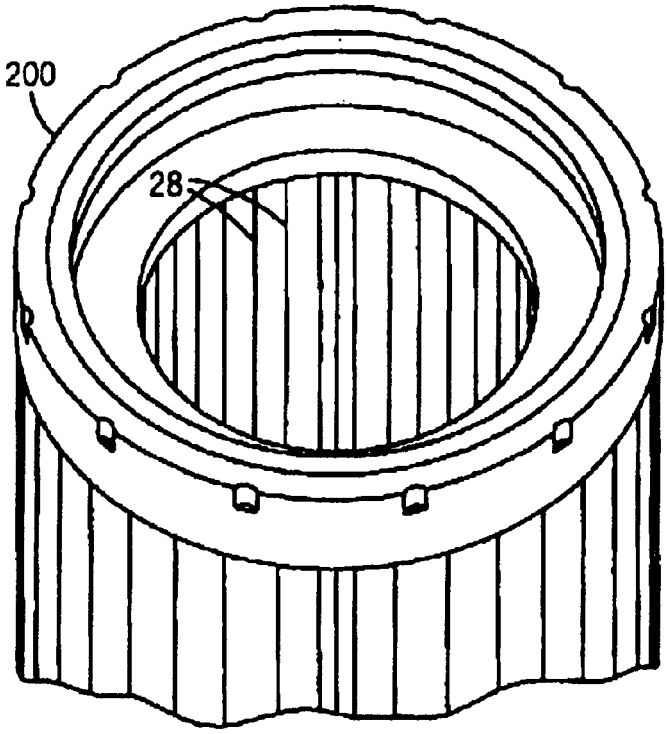

FIG. 9 is like FIG. 4 and shows the present invention.

Figure 5:
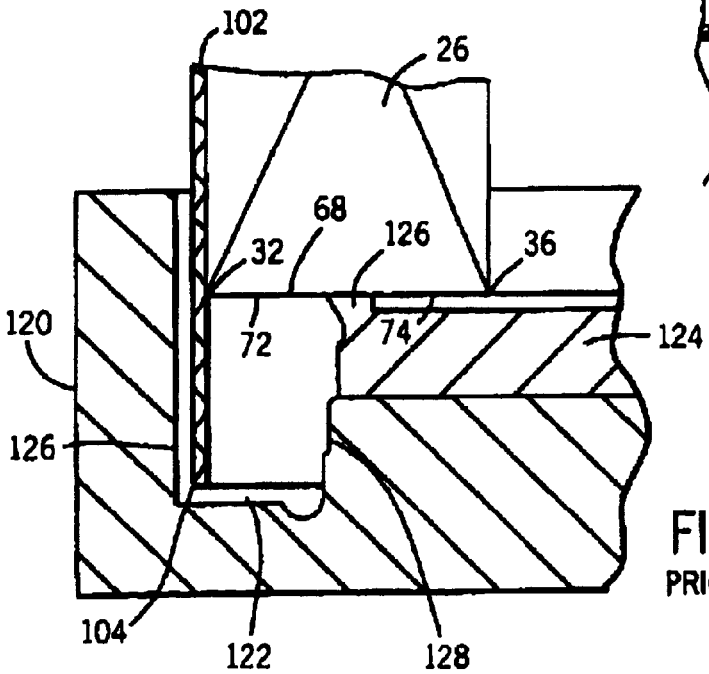
FIG. 5 PRIOR ART
FIG. 5 is taken from FIG. 11 of the incorporated '700 patent, and is a view of a mold for molding an end cap onto pleated filter media of a filter element.
Figure 10:
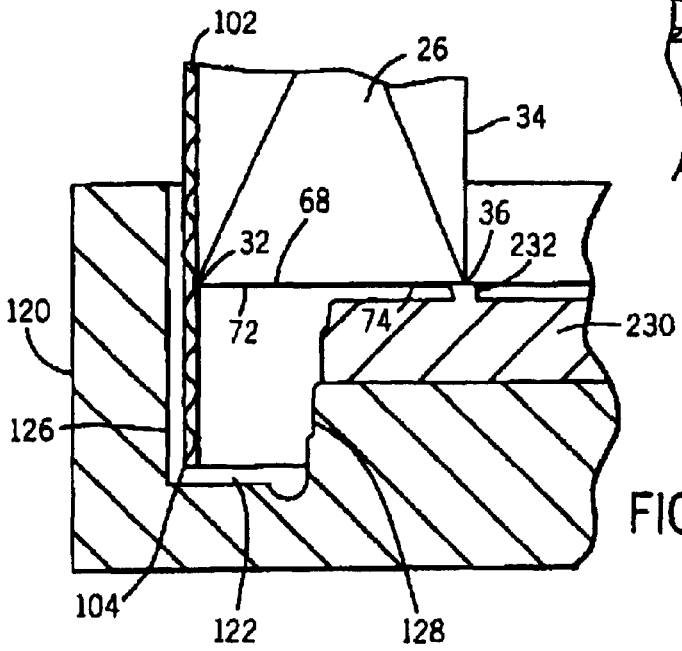

FIG. 10 is like FIG. 5 and shows the present invention.

Figure 6:
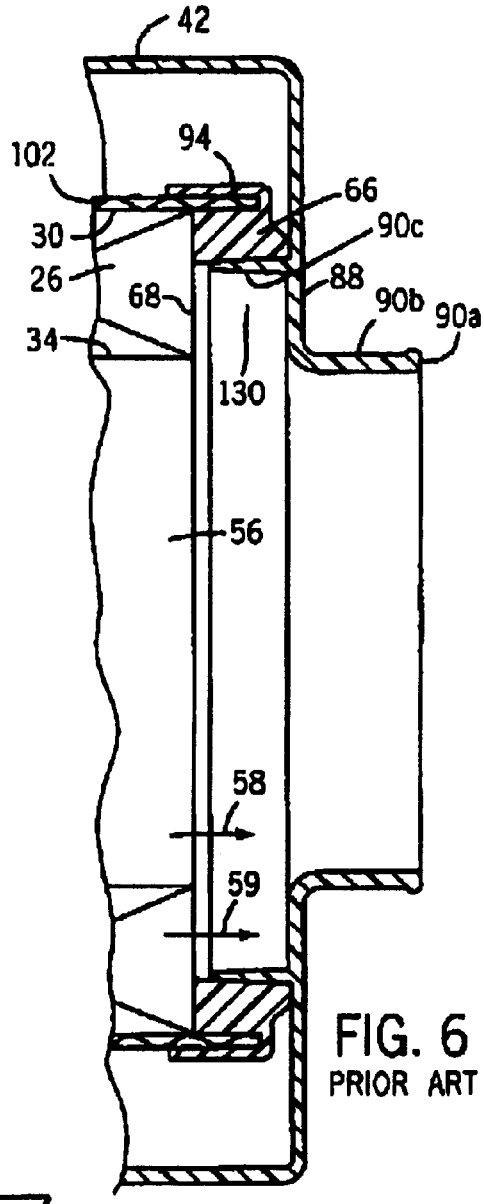
FIG. 6 PRIOR ART
FIG. 6 is taken from FIG. 10 of the incorporated '700 patent, and is a view like a portion of FIG. 2, and shows an alternate embodiment.
Figure 11:
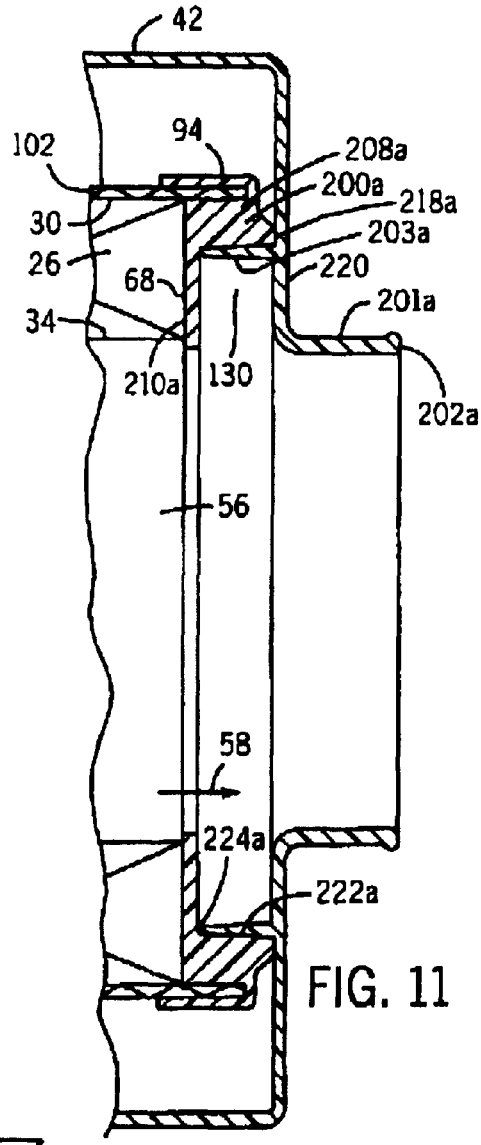

FIG. 11 is like FIG. 6 and shows the present invention.

Figure 12:
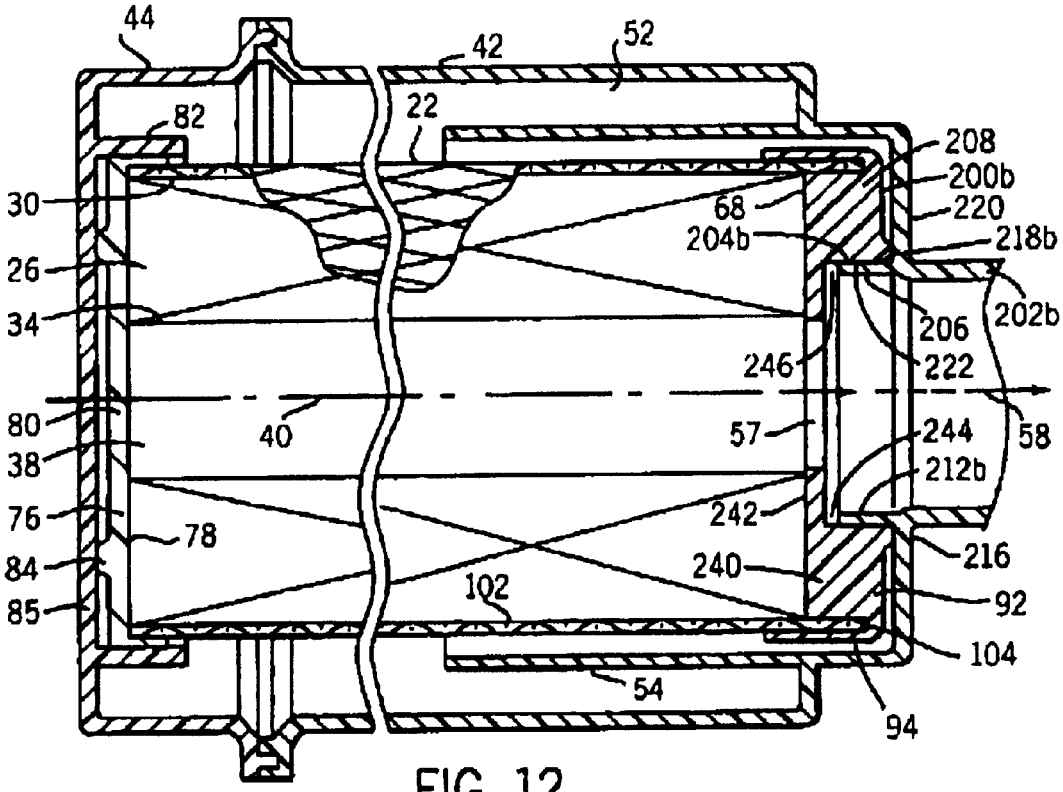

FIG. 12 is like FIG. 7 and shows a further embodiment.

Figure 13:
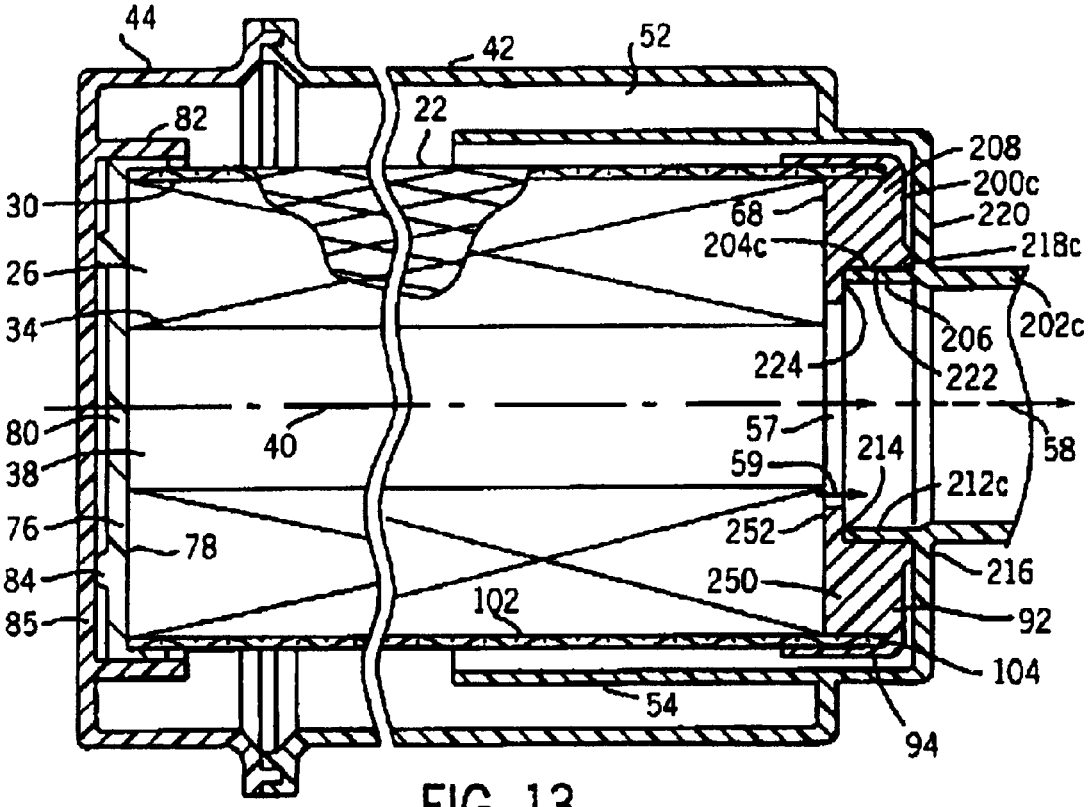

FIG. 13 is like FIG. 7 and shows a further embodiment.

Figure 14:
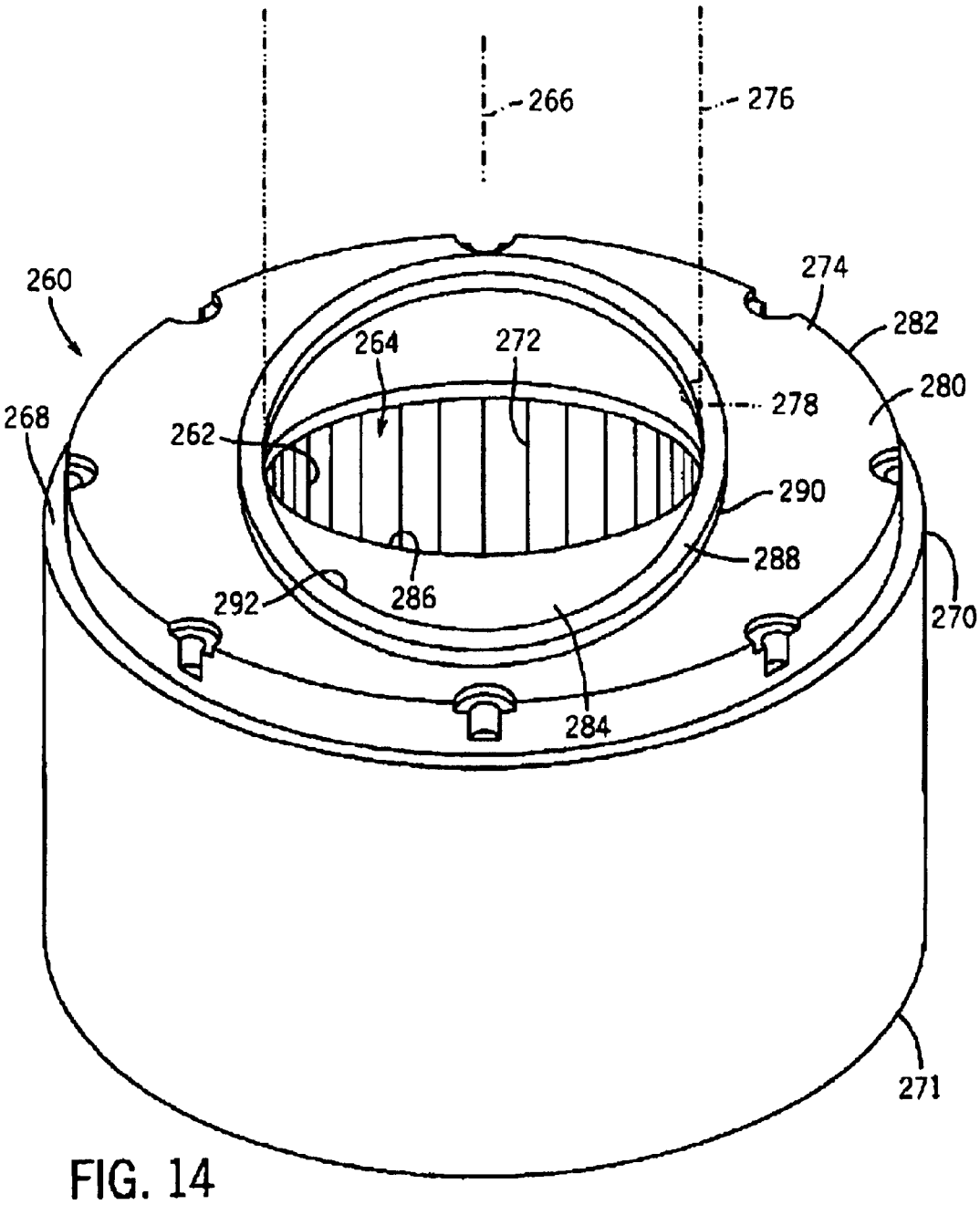

FIG. 14 is like FIG. 9 and shows a further embodiment.

DETAILED DESCRIPTION OF THE INVENTION

Prior Art

FIGS. 1 and 2 show a filter 20 including a filter element 22 contained within a housing 24. Filter element 22 is provided by pleated filter media 26, FIG. 2, having a plurality of pleats 28, FIGS. 3, 4, in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along an axis 40. Housing 24 is typically cylindrical and is provided by housing sections 42 and 44 mounted to each other in conventional manner such as by overcenter spring clip type clamps such as 46, or in other suitable manner. The housing has an inlet 50 admitting inlet fluid, such as air or liquid, radially and/or tangentially into annular space 52 within the housing around filter clement 22. Alternatively, the inlet may be at an axial end of the housing, for example as in incorporated U.S. Pat. No. 6,391,076. The housing may include an interior dam or deflection surface 54 for blocking direct impact against filter element 22 and/or for directing flow, for example in a spiral or toroidal pattern. The fluid flows laterally or radially inwardly through filter media 26 into hollow interior 38, and then the clean fluid flows axially rightwardly in FIG. 2 in hollow interior 38 along flow passage 56 as shown at arrows 58, 59. Alternatively or additionally, the fluid may flow axially through the filter media as in the noted incorporated '076 patent.

Flow passage 56 extending along axis 40 circumscribes hollow interior 38 and has a flow perimeter 60 greater than inner perimeter 34 defined by inner pleat tips 36, as described in the incorporated '700 patent. Flow perimeter 60 is less than outer perimeter 30 defined by outer pleat tips 32. Inner perimeter 34 defines and bounds a first cross-sectional area. Flow perimeter 60 defines and bounds a second cross-sectional area. The second cross-sectional area is greater than the first cross-sectional area. Outer perimeter 30 defines and bounds a third cross-sectional area. The second cross-sectional area is less than the third cross-sectional area. Filter element 22 has first and second axial ends 62 and 64. Axial end 62 is open and provides axial flow passage 56 therethrough. An end cap 66 of soft resilient compressible material, such as foamed potted urethane, axially abuts the axial ends 68 of the pleats. End cap 66 has an inner perimeter 70 greater than inner perimeter 34 defined by inner pleat tips 36. End cap 66 partially covers the axial ends 68 of the pleats such that the laterally outward portions 72 of the axial ends 68 of the pleats 28 are covered by end cap 66 but not the laterally inward portions 74 of the axial ends 68 of the pleats, such that the laterally inward portions 74 of the axial ends of the pleats are uncovered and exposed at axial end 62 of filter element 22, FIG. 4.

In one embodiment, second axial end 64 of filter element 22 is closed. A second end cap 76, FIG. 2, of soft compressible resilient material, such as foamed potted urethane, is provided at second end 64 of filter element 22 and completely covers the axial ends 78 of the pleats including the outer pleat tips 32 and the inner pleat tips 36 at axial end 64. End cap 76 also includes a central section 80 spanning and completely covering hollow interior 38 of filter element 22 at axial end 64 of the filter element. Housing section 44 includes an annular interior sidewall 82 extending partially axially into the housing to locate and retain filter element 22 at axial end 64. In other embodiments, central section 80 of end cap 76 is omitted, and a portion of housing 44 extends into hollow interior 38 of filter element 22 to close axial end 64 of the filter element and to position axial end 64 of the filter element within the housing. Further embodiments are shown in the noted incorporated '076 patent. End cap 76 includes an annular ridge 84 engaging axial end wall 85 of housing section 44 and slightly axially compressed thereagainst to further aid in retention of filter element 22 within the housing and to accommodate axial tolerances. End cap 66 also includes an annular ridge 86 engaging axial end wall 88 of housing section 42 and slightly radially compressed thereagainst to aid in retaining filter element 22 within the housing and to accommodate axial tolerances and also to provide an axial seal to prevent bypass of dirty air from annular chamber 52 around axial end 62 of the filter element. Axial end wall 88 of housing section 42 has an outlet flow tube 90 extending therethrough. In addition to or alternatively to the axial seal at 86, end cap 66 provides a radial seal at 70 against outlet flow tube 90.

End cap 66 has a sidewall 92 extending axially away from axial ends 68 of pleats 28 at axial end 62 of filter element 22. The sidewall has the noted inner perimeter 70, and has an outer perimeter 94. As noted above, inner perimeter 70 of sidewall 92 is greater than inner perimeter 34 of filter element 22 defined by inner pleat tips 36. Inner perimeter 70 of sidewall 92 of end cap 66 is less than outer perimeter 30 of filter element 22 defined by outer pleat tips 32. Outer perimeter 94 of sidewall 92 of end cap 66 is greater than outer perimeter 30 of filter element 22 defined by outer pleat tips 32. Flow tube 90 has an inner section 96 axially facing the axial ends 68 of pleats 28. Inner section 96 of flow tube 90 has an inner perimeter 98 and an outer perimeter 100. Outer perimeter 100 is greater than inner perimeter 70 of sidewall 92 of end cap 66, such that as filter element 22 at end cap 66 is axially slid rightwardly over inner section 96 of flow tube 90, end cap 66 is radially compressed to expand inner perimeter 70 along outer sidewall 100 of flow tube inner section 96 to effect the noted radial seal. Inner perimeter 70 of end cap 66 is preferably stepped, as shown at 71 in FIG. 8 of the noted incorporated '700 patent, to have slightly progressively decreasing diameters from right to left as viewed therein, to receive and guide inner section 96 of flow tube 90 therealong and increase radial sealing pressure. End cap 66 circumscribes inner section 96 of flow tube 90 and bears radially thereagainst at 70 in sealing relation to form the noted radial seal thereat. End wall 88 of housing section 42 axially faces axial ends 68 of pleats 28, and end cap 66 also bears axially against end wall 88 in sealing relation at 86 to form the noted axial seal thereat.

An outer liner 102, FIG. 2, provided by an expanded wire mesh or screen or perforated metal or plastic, circumscribes filter element 22 along outer pleat tips 32 and has an axial end section 104 extending axially beyond the axial ends 68 of pleats 28. An inner liner may also be provided at inner perimeter 34 along inner pleat tips 36. As above described, flow tube 90 communicates with hollow interior 38 of the filter element along flow passage 56 and extends axially from the axial end of the filter element. End cap 66 at the axial end of the filter element bears radially between and is radially compressed between and against section 104 of outer liner 102 and inner section 96 of flow tube 90. Outer liner 102 extends axially at 104 into end cap 66 and is potted therein during the molding process, as described in the incorporated '700 patent. As noted above, sidewall 92 of end cap 66 extends axially away from the axial ends 68 of pleats 28 at the axial end of the filter element. Outer perimeter 94 of the end cap sidewall circumscribes outer liner section 104. The filter element may also include an inner liner 103, FIG. 5, along inner pleat tips 36.

Pleats 28 have pairs of walls defining axially extending interior channels 106, FIG. 3, and also as shown in FIG. 7 of the incorporated '700 patent, and axially extending exterior channels 108. The walls of the pleats defining the exterior channels 108 are sealed to each other near axial end 62 of the filter element by heat seal bonding along glue strips, also known as hot melt, such as 110, and as shown in the incorporated '700 patent at FIGS. 4–6, 9, and for example as disclosed in U.S. Pat. No. 5,106,397, incorporated herein by reference. This prevents bypass of dirty air around the axial ends of the pleats at inner exposed portions 74. Fluid such as air flowing radially inwardly through the filter media as shown at 112, and as shown in the incorporated '700 patent at FIG. 4, or alternatively flowing axially as shown in the incorporated '076 patent at FIGS. 15, 16 thereof, must flow through the sidewalls of pleats 28 before such fluid can flow axially through hollow interior 40 as shown at arrow 58 or axially through the inward portions 74 of the axial ends 68 of the pleats as shown at arrow 59. Some of such air can flow axially rightwardly as shown at arrow 59 axially along interior channels 106, and the balance of the air continues radially inwardly as shown at arrow 114, and as shown in the incorporated '700 patent in FIG. 4, and then flows axially as shown at arrow 58. The axial ends of exterior channels 108 at the axial end of the filter element are blocked by the noted hot melt seal bonding along adhesive strips 110. Fluid flowing through the filter element is forced to pass from exterior channels 108 to interior channels 106. FIGS. 6 and 9 of the incorporated '700 patent show the seal bonded adhesive 110 extending in exterior channels 108 all the way from inner pleat tips 36 to outer pleat tips 32 as idealized. If the seal bond does not extend all the way from inner pleat tip 36 to outer pleat tip 32, then the shape of the interior channel 106 at outer pleat tip 32 will generally be more rounded and the walls of pleats 28 forming exterior channels 108 at outer pleat tips 32 will usually be closer together. In an alternative, the adhesive seal bond in exterior channels 108 may extend from inner pleat tips 36 only partially towards outer pleat tips 32, and the outer portions of exterior channels 108 are blocked at the axial end of the filter element at end cap 66. During the molding potting process, the liquid castable material into which the pleated filter media is dipped will foam up a short distance axially into the channels between the pleats, as shown in the incorporated '700 patent at inner section 116 in FIGS. 4, 8, 9 thereof, of the end cap which has migrated a distance 118, FIG. 4 of the incorporated '700 patent, between the pleats. The spacing of glue strips 110 on the pleats from the axial ends 68 of the pleats may be adjusted as desired in standard glue seal strip applicator machines. Preferably, glue seal strips 110 are spaced from axial ends 68 of the pleats by a small distance 118 to enable a slight deformation of the axial ends 68 of the pleats by a dam in the mold during the molding potting process, to keep the liquid castable material of the end cap from flowing radially inwardly into inner portions 74 of the pleat ends which are desired to be exposed, which molding process and dam are disclosed in the noted '700 patent, and noted hereinafter. Alternatively, seal glue strips 110 may be applied at axial ends 68 of the pleats, without gap 118 therebetween.

FIG. 5 shows a mold 120 for molding or potting end cap 66 onto pleated filter media 26 of the filter element. The mold has a trough 122 extending along an annular first perimeter and holding liquid castable material, such as urethane, therein into which axial ends 68 of pleats 28 are dipped. The mold has an insert 124 with an upstanding dam 126 extending along a second annular perimeter circumscribed by the noted annular perimeter of trough 122. Dam 126 engages axial ends 68 of the pleats between outer pleat tips 32 and inner pleat tips 36 and impedes flow of liquid castable material laterally radially inwardly towards inner pleat tips 36. Trough 122 partially spans axial ends 68 of the pleats such that the laterally outward portions 72 of the axial ends of the pleats are covered by liquid castable material but not the laterally inward portions 74 of the pleats, such that laterally outward portions 72 of the axial ends 68 of the pleats are covered by end cap 66, and the laterally inward portions 74 of the axial ends 68 of the pleats are uncovered by end cap 66 and are left exposed. It is preferred that the pleated filter media be dipped into the liquid castable material in the mold by lowering the pleated filter media downwardly until axial ends 68 of the pleats are engaged by dam 126, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36. Trough 122 is bounded by an outer perimeter 126 and an inner perimeter 128. Outer perimeter 126 of trough 122 is greater than outer perimeter 30 of the filter element defined by outer pleat tips 32. Inner perimeter 128 of trough 122 is less than outer perimeter 30 of the filter element. Inner perimeter 128 of trough 122 is greater than inner perimeter 34 of the filter element defined by inner pleat tips 36. The noted second perimeter of the mold at annular dam 126 is less than or equal to inner perimeter 128 of trough 122.

As noted, the method for molding end cap 66 onto pleated filter media 26 involves dipping axial ends 68 of the pleats into liquid castable material in trough 122 of mold 120, and engaging axial ends 68 of the pleats against dam 126 at a location between outer pleat tips 32 and inner pleat tips 36 such that dam 126 impedes flow of the liquid castable material laterally inwardly towards inner pleat tips 36. Trough 122 is provided and aligned such that it partially spans axial ends 68 of the pleats such that the laterally outward portions 72 of the axial ends of the pleats are covered by the liquid castable material during dipping, but not the laterally inward portions 74 of the axial ends of the pleats. Further in accordance with the described method, laterally inward flow of the liquid castable material is impeded along the axial ends of the pleats toward inner pleat tips 36 by providing and aligning dam 126 to engage axial ends 68 of the pleats between outer pleat tips 32 and inner pleat tips 36 such that laterally outward portions 72 of the axial ends of the pleats are covered by end cap 66, and laterally inward portions 74 of the axial ends of the pleats are uncovered by end cap 66 and are left exposed. Trough 122 and filler element 22 are aligned during the noted dipping such that outer perimeter 126 of trough 122 circumscribes outer perimeter 30 of the filter element defined by outer pleat tips 32, and inner perimeter 128 of trough 122 circumscribes inner perimeter 26 of the filter element defined by inner pleat tips 36.

FIG. 6 shows an alternate embodiment wherein outlet flow tube 90a has an outer section 90b of reduced diameter to accommodate engine compartment size and location requirements, yet maintaining an increased diameter inner section 90c maintaining the increased diameter and perimeter flow passage 56 including axial fluid flow at 58 and the extra axial fluid flow at 59, FIGS. 2 and 6. The spacing of axial end wall 88 of housing section 42 from axial ends 68 of the filter media pleats provides a plenum 130 accommodating the extra flow and reducing restriction.

The described filter construction was developed for air filters, though may be used for other fluids such as liquid. In the disclosed embodiment, fluid to be filtered flows laterally inwardly through the filter media from the outer perimeter to the inner perimeter and then flows axially in the hollow interior, such that flow passage 56 is an outlet flow passage. Alternatively, fluid to be filtered may flow axially in hollow interior 38 and then flow laterally outwardly through the filter media from the inner perimeter to the outer perimeter, in which case flow passage 56 is the inlet flow passage. In another alternative, fluid flow to or from axial end 64 of the filter element and through the media may be axial or a combination of axial and radial, for example as in the noted incorporated '076 patent. In other alternatives, metal end caps are used instead of urethane end caps, or various combinations of materials are used for the end caps. In further alternatives, outer section 90b, FIG. 7, of the flow tube has a larger inner diameter than inner section 90c.

Present Invention

During further development, it has been found that there are some applications where enhanced structural integrity is desired in the end cap area at 66, for example wet conditions, heavy load conditions, vibration, and the like. There are also circumstances where cost reduction is desired. There are also circumstances where even further sealing is desired.

FIGS. 7–11 are like FIGS. 2–6, respectively, and use like references numerals where appropriate to facilitate understanding. Filter element 22 is provided by pleated filter media 26 having a plurality of pleats 28 in a closed loop having an outer perimeter 30 defined by a plurality of outer pleat tips 32, and an inner perimeter 34 defined by a plurality of inner pleat tips 36, and having a hollow interior 38 extending along axis 40. Fluid flows axially in hollow interior 38 as shown at arrow 58. The filter element has first and second axial ends 62 and 64. The first axial end is open and provides an axial flow passage 57 therethrough along axis 40 communicating with hollow interior 38. A resiliently compressible end cap 200 at the open axial end covers inner and outer pleat tips 36 and 32 and spans radially along axial ends 68 of the pleats between inner and outer perimeters 34 and 30. A flow tube 202 communicates with hollow interior 38 and extends along axial flow passage 57 and engages end cap 200. Flow tube 202 at engagement 204 with end cap 200 has an inner perimeter 206 greater than inner perimeter 34 defined by inner pleat tips 36. Inner perimeter 206 of flow tube 202 at engagement 204 with end cap 200 is less than outer perimeter 30 defined by outer pleat tips 32. End cap 200 has a first section 208 extending radially inwardly from outer perimeter 30 defined by outer pleat tips 32, and has a second section 210 extending radially outwardly from inner perimeter 34 defined by inner pleat tips 36. First and second sections 208 and 210 meet at a junction defining a step at 204 facing radially inwardly toward and engaging flow tube 202. The step at 204 has a first axial length. Flow tube 202 has an inner tubular portion 212 extending axially along step 204. Tubular portion 212 has an inner axial end 214 facing the first axial end of the filter element at axial ends 68 of the pleats and separated therefrom by section 210 of end cap 200. Flow tube 202 has a flange portion 216 extending radially from tubular portion 212 and facing the first axial end of the filter element at axial ends 68 of the pleats and axially spaced from inner axial end 214 of tubular portion 212 by a second axial length which is less than the noted first axial length, to thus provide axial compression of end cap 200 including at axial seal region 218. End cap 200 has a first axial thickness at first section 208 at outer perimeter 30, a second axial thickness at first section 208 at step 204, a third axial thickness at second section 210 at step 204, and a fourth axial thickness at second section 210 at inner perimeter 34. The noted second axial thickness is greater than the noted third axial thickness. The noted first axial thickness is greater than the noted fourth axial thickness. The noted first axial thickness is less than the noted second axial thickness. The noted third and fourth axial thicknesses are substantially the same.

In one embodiment, the filter element includes in combination the noted second end cap 76 at the second axial end 64 of the filter element at axial ends 78 of the pleats and covering inner and outer pleat tips 36 and 32 and spanning radially between inner and outer perimeters 34 and 30, and also spanning hollow interior 38 and closing the second axial end of the filter element. The filter element is preferably contained in the noted housing having an end wall 220 facing the first axial end of the filter element. Flow tube 202 is part of end wall 220.

Flow tube 202 engages end cap 200 at first, second and third engagement seals 218, 222 and 224, respectively, to provide triple scaling of end cap 200 to flow tube 202. Seals 218 and 224 are axial seals, and seal 222 is a radial seal. First inner portion 212 of flow tube 202 extends axially along step 204 and engages the step to form the noted second radial seal 222. Tubular portion 212 has the noted inner axial end 214 axially engaging end cap 200 at the noted second section 210 and forming the noted third axial seal 224. Flow tube 202 has the noted flange portion 216 extending radially from tubular 212 and axially spaced outwardly of inner axial end 214 and axially engaging end cap 200 at first section 208 and providing the noted first axial seal 218. Second radial seal 222 is axially between first and third axial seals 218 and 224.

FIG. 10 shows a mold 120 for molding or potting end cap 200 onto pleated filter media 26 of the filter element. The mold has a trough 122 as above. The mold has an insert 230 similar to insert 124 but with upstanding dam 232 at inner pleat tips 36 at inner perimeter 34.

FIG. 11 shows an alternate embodiment wherein outlet flow tube 202a has an outer section 201a of reduced diameter to accommodate engine compartment size and location requirements, yet maintaining an increased inner diameter section 203a, as in FIG. 6. The spacing of axial end wall 220 of the housing from axial ends 68 of the filter media pleats provides the noted plenum 130. End cap 200a has the noted first and second sections 208a and 210a. End cap 200a covers the inner and outer pleat tips 36 and 32 and spans radially between the inner and outer perimeters 34 and 30. The end cap provides the noted triple sealing at axial seals 218a and 224a and at radial seal 222a.

As shown in comparing FIGS. 3, 4, 8, 9, the present construction seals the axial ends 68 of the pleats solely with urethane end cap 200, or 200a, and eliminates reliance upon hot melt 110 for sealing purposes. This eliminates the adhesive component in the design of FIGS. 3, 4, and simplifies the production process, reducing cost. In the present construction of FIGS. 8, 9, the axial ends 68 of the pleats 28 are sealed with the same urethane 200, or 200a, used to pot the element, rather than a combination of hot melt 110 and urethane 66 as in FIGS. 3, 4. The present construction also eliminates reliance upon the interface between the glue 110, the filter media of the pleats 28, and the urethane 66 to prevent contaminants from passing to the clean side of the filter. The present construction further facilitates concentricity of the closed loop configuration. The present construction further enhances structural integrity, particularly in wet conditions, heavy load conditions, and vibration conditions.

FIG. 12 shows a further embodiment and uses like reference numerals from above where appropriate to facilitate understanding. End cap 200b has first section 240 extending radially inwardly from the outer perimeter 30 defined by outer pleat tips 32, and has a second section 242 extending radially inwardly from first section 240. First and second sections 240 and 242 meet at a junction defining a step 204b. Flow tube 202b communicates with hollow interior 38 and extends along axial flow passage 57. Flow tube 202b has an inner tubular portion 212b extending along step 204b and radially engaging the step to form a radial seal 222 therewith. Flow tube 202b has the noted flange portion 216 extending radially outwardly from tubular portion 212b and axially spaced from first axial end 68 of the filter element by first section 240 of end cap 200b therebetween. Flange portion 216 engages first section 240 of end cap 200b at engagement point 218b to form an axial seal therewith. Tubular portion 212b has an inner axial end 244 axially facing first end 68 of the filter element. Second section 242 of end cap 200b is axially between inner axial end 244 of tubular portion 212b and first axial end 68 of the filter element. Second section 242 of end cap 200b extends radially inwardly from first section 240 of the end cap all the way to inner perimeter 34 defined by inner pleat tips 36. End cap 200b covers inner and outer pleat tips 36 and 32 and spans radially between inner and outer perimeters 34 and 30. Inner axial end 244 of tubular portion 212b is axially spaced from second section 242 of end cap 200b by an axial gap 246 therebetween. This may be desired in some applications to protect against excessive axial compression or axial crushing. For example, it may be desired to protect the pleat ends at 68 from the line of axial force otherwise provided by the annulus at inner end 244 of the flow tube, with or without adhesive or hot melt 110 between the pleats.

FIG. 13 shows a further embodiment and uses like reference numerals from above where appropriate to facilitate understanding. End cap 200c has a first section 250 extending radially inwardly from the outer perimeter 30 defined by outer pleat tips 32, and has a second section 252 extending radially inwardly from first section 250. First and second sections 250 and 252 meet at a junction defining a step 204c. Flow tube 202c communicates with hollow interior 38 and extends along axial flow passage 57. Flow tube 202c has a tubular portion 212c extending axially along step 204c and radially engaging the step to form a radial seal therewith. Flow tube 202c has flange portion 216 extending radially outwardly from tubular portion 212c and axially spaced from first axial end 68 of the filter element by the first section 250 of end cap 200c therebetween. Flange portion 216 axially engages first section 250 of end cap 200c at engagement point 218c to form an axial seal therewith. Tubular portion 212c has inner axial end 214 axially facing first end 68 of the filter element. Second section 252 of end cap 200c is axially between inner axial end 214 of tubular portion 212c and first end 68 of the filter element. Second section 252 of end cap 200c extends radially inwardly from first section 250 only partially towards inner perimeter 34 defined by inner pleat tips 36 and does not cover inner pleat tips 36. This embodiment may be desirable in instances where the additional migration or flow at 59 is desired. This embodiment may also be desirable where additional flow of potting material into the pleat ends and between the wall segments of the pleats is desired. For example, the wider the radial extent of the end cap along axial end 68 of the filter element, the greater the axially leftward migration of the molten potting material into and between the pleats. This may be desirable for enhanced sealing including greater interface area with the adhesive or hot melt 110 between the pleats. Inner axial end 214 of tubular portion 212c may axially engage second section 252 of end cap 200c as shown in FIG. 13 to form a second axial seal 224 therewith as in FIG. 7. Alternatively, inner axial end 214 may be spaced axially rightwardly of second section 252 of the end cap by an axial gap therebetween as at axial gap 246 in FIG. 12.

FIG. 14 shows a further embodiment including a filter element 260 including a closed loop filter media member 262 having a hollow interior 264 extending along a given axis 266, and which may also include an outer prefilter member 268 such as open cell foam. Fluid flows axially in hollow interior 264. The filter element has first and second axial ends 270 and 271. First axial end 270 is open and provides an axial flow passage 272 therethrough along axis 266 communicating with hollow interior 264. A resiliently compressible end cap 274 is provided at first axial end 270. A flow tube as shown in dashed line at 276 and which is comparable to flow tube 202, communicates with hollow interior 264 and extends along axial flow passage 272. Flow tube 276 has a tubular portion 278, comparable to tubular portion 212, engaging end cap 274 and forming a seal therewith, comparable to seal 218 and/or 222 and/or 224. Tubular portion 278 is cylindrical. Filter media member 262 is non-cylindrical. In one embodiment, the filter media member is elliptical, such as oval, racetrack shaped, or the like. End cap 274 has a first section 280 extending radially inwardly from an outer perimeter 282, and has second section 284 extending radially inwardly from first section 280 to an inner perimeter 286. First and second sections 280 and 284 are comparable to first and second sections 240 and 242 and to first and second sections 250 and 252. First and second sections 280 and 284 meet at a junction defining a step 288, comparable to steps 204, 204b, 204c. First section 280 has the noted outer perimeter 282, and has an inner perimeter 290 at step 288. Second section 284 has an outer perimeter 292 at step 288, and has the noted inner perimeter 286 communicating with hollow interior 264. Outer perimeter 282 of first section 280 is non-cylindrical. Inner perimeter 290 of first section 280 is cylindrical. Step 288 is cylindrical. Outer perimeter 292 of second section 284 is cylindrical. Cylindrical tubular portion 278 engages end cap 274 at cylindrical step 288, comparable to the above noted engagement of cylindrical portions 212, 212b, 212c with steps 204, 204b ,204c. Inner perimeter 286 of second section 284 is non-cylindrical. Filter media member 262 and outer perimeter 282 of first section 280 of end cap 274 are elliptical and have a radially extending major axis (left-right in FIG. 14), and a radially extending minor axis (up/down in FIG. 14). The radial extension of first section 280 of end cap 274 along the major axis between outer perimeter 282 of first section 280 of end cap 274 and step 290 is greater than the radial extension of first section 280 of end cap 274 along the minor axis between outer perimeter 282 of first section 280 of end cap 274 and step 288. The radial extension of second section 284 of end cap 274 along the minor axis between step 288 and inner perimeter 286 of second section 284 of end cap 274 is greater than the radial extension of the second section 284 of end cap 274 along the major axis between step 288 and inner perimeter 286 of second section 284 of end cap 274. In the embodiment shown, filter media member 262 is provided by pleated filter media having a plurality of pleats as above in a closed loop having an outer perimeter defined by a plurality of outer pleat tips, comparable to pleat tips 32, and an inner perimeter defined by a plurality of inner pleat tips, comparable to pleat tips 36, the loop having the noted hollow interior 264 extending along the noted given axis 266. Other types of filter media may be used, including non-pleated media. The disclosed elliptical filter design may be used in implementations where it is desired to have an elliptical filter and to maximize the inlet or outlet diameter of the filter or match specifications requiring cylindrical inlet or outlet flow tubes.

It is recognized that various equivalents, alternatives and modifications are possible within the scope of the appended claims.

What is claimed is:

1. A filter [element] comprising pleated filter media having a plurality of pleats in a closed loop having an outer perimeter defined by a plurality of outer pleat tips, and an inner perimeter defined by a plurality of inner pleat tips, said loop having a hollow interior extending along a given axis, wherein fluid flows axially in said hollow interior, said filter [element] having first and second axial ends, said first axial end being open and providing an axial flow passage therethrough along said axis communicating with said hollow interior, a resiliently compressible *first* end cap at said first axial end covering said inner and outer pleat tips and spanning radially between said inner and outer perimeters, [a flow tube communicating with said hollow interior and extending along said axial flow passage and engaging said end cap, wherein said flow tube at said engagement with said end cap has an inner perimeter greater than said inner perimeter defined by said inner pleat tips,] and comprising in combination a second end cap at said second axial end of said filter [element] covering said inner and outer pleat tips and spanning radially between said inner and outer perimeters and also spanning said hollow interior and closing said second axial end of said filter[element].

2. The filter [element] according to claim [1] *19* wherein said inner perimeter of said flow tube at said engagement with said *first* end cap is less than said outer perimeter defined by said outer pleat tips.

3. The filter [element] according to claim [2] *1* wherein said *first* end cap has a first section extending radially inwardly from said outer perimeter defined by said outer pleat tips, and has a second section extending radially outwardly from said inner perimeter defined by said inner pleat tips, said first and second sections meeting at a junction defining a step[facing radially toward and engaging said flow tube].

4. The filter [element] according to claim [3] *20* wherein said step has a first axial length, said flow tube has a tubular portion extending axially along said step, said tubular portion having an inner axial end axially facing said first axial end of said filter[element], and said flow tube has a flange portion extending radially from said tubular portion and facing said first axial end of said filter [element] and axially spaced from said inner axial end of said tubular portion by a second axial length less than said first said axial length.

5. The filter [element] according to claim 3 wherein said *first* end cap has a first axial thickness at said first section at said outer perimeter defined by said outer pleat tips, a second axial thickness at said first section at said step, a third axial thickness at said second section at said step, and a fourth axial thickness at said second section at said inner perimeter defined by said inner pleat tips, and wherein said second axial thickness is greater than said third axial thickness.

6. The filter [element] according to claim 5 wherein said first axial thickness is greater than said fourth axial thickness.

7. The filter [element] according to claim 5 wherein said first axial thickness is less than said second axial thickness.

8. The filter [element] according to claim 5 wherein said third and fourth axial thicknesses are substantially the same.

9. The filter [element] according to claim [1] *19* comprising a housing containing said filter[element], said housing having an end wall axially facing said first axial end of said filter[element], and wherein said flow tube is part of said end wall.

10. The filter [element] according to claim 1 wherein fluid flows laterally radially through said filter [element] *media* between said outer and inner perimeters, and flows axially in said hollow interior.

11. A filter [element] comprising a closed loop filter media member having a hollow interior extending along a given axis, wherein fluid flows axially in said hollow interior, said filter [element] having first and second axial ends, said first axial end being open and providing an axial flow passage therethrough along said axis communicating with said hollow interior, a resiliently compressible end cap at said first axial end, [a flow tube communicating with said hollow interior and extending along said axial flow passage, said flow tube having a tubular portion engaging said end cap and forming a seal therewith, said tubular portion being cylindrical,] said filter media member being non-cylindrical.

12. The filter [element] according to claim 11 wherein said filter media member is elliptical.

13. The filter [element] according to claim 11 wherein said end cap has a first section extending radially inwardly from an outer perimeter, and has a second section extending radially inwardly from said first section to an inner perimeter, said first and second sections meeting at a junction defining a step, said first section having said outer perimeter and having an inner perimeter at said step, said second section having an outer perimeter at said step and having said inner perimeter communicating with said hollow interior, said outer perimeter of said first section being non-cylindrical, said inner perimeter of said first section being cylindrical, said step being cylindrical, said outer perimeter of said second section being cylindrical.

14. The filter [element] according to claim 13 wherein said cylindrical tubular portion engages said end cap at said cylindrical step.

15. The filter [element] according to claim *13 further comprising a flow tube communicating with said hollow interior and extending along said axial flow passage, said flow tube having a tubular portion engaging said end cap and forming a seal therewith, said tubular portion being cylindrical,* wherein said inner perimeter of said second section is non-cylindrical.

16. The filter [element] according to claim 13 wherein said filter media member and said outer perimeter of said first section of said end cap are elliptical and have a radially extending major axis and a radially extending minor axis, wherein the radial extension of said first section of said end cap along said major axis between said outer perimeter of said first section of said end cap and said step is greater than the radial extension of said first section of said end cap along said minor axis between said outer perimeter of said first section of said end cap and said step, and wherein the radial extension of said second section of said end cap along said minor axis between said step and said inner perimeter of said second section of said end cap is greater than the radial extension of said [o] second section of said end cap section along said major axis between said step and said inner perimeter of said second section of said end cap.

17. The filter [element] according to claim 11 wherein said filter media member comprises pleated filter media having a plurality of pleats in a closed loop having an outer perimeter defined by a plurality of outer pleat tips, and an inner perimeter defined by a plurality of inner pleat tips, said loop having said hollow interior extending along said given axis.

*18. The filter of claim 1, wherein said first end cap is configured to receive a flow tube communicating with said hollow interior and extending along said axial flow passage and engaging said first end cap, wherein said flow tube at said engagement with said first end cap has an inner perimeter greater than said inner perimeter defined by said inner pleat tips.*

*19. The filter of claim 1, further comprising a flow tube communicating with said hollow interior and extending along said axial flow passage and engaging said first end cap, wherein said flow tube at said engagement with said first end cap has an inner perimeter greater than said inner perimeter defined by said inner pleat tips.*

*20. The filter of claim 3, further comprising a flow tube communicating with said hollow interior and extending along said axial flow passage and engaging said first end cap, wherein said flow tube at said engagement with said first end cap has an inner perimeter greater than said inner perimeter defined by said inner pleat tips, the first and second sections meeting at a junction defining a step facing radially toward and engaging the flow tube.*

*21. The filter of claim 11, the end cap at said first axial end configured to receive a flow tube communicating with said hollow interior and extending along said axial flow passage, said flow tube having a tubular portion engaging said end cap and forming a seal therewith, said tubular portion being cylindrical.*

*22. The filter of claim 11 further comprising a flow tube communicating with said hollow interior and extending along said axial flow passage, said flow tube having a tubular portion engaging said end cap and forming a seal therewith, said tubular portion being cylindrical.*

*23. A filter assembly comprising:*

*a filter media element comprising a first end and a second end, the element being shaped to form a hollow interior extending from the first end to the second end, wherein the hollow interior defines an inner boundary of the element and the outer surface of the element defines an outer boundary;*

*a first end cap disposed at the first end;*

*a second end cap disposed at the second end, the second end cap covering both the filter element and the hollow interior at the second end; and*

*a step disposed on the first end cap for reception of a flow tube, the step being a right angle.*

* * * * *